United States Patent [19]

Briggs

[11] 4,017,430
[45] Apr. 12, 1977

[54] COATING COMPOSITION
[75] Inventor: William Scott Briggs, Bellingham, Wash.
[73] Assignee: Georgia-Pacific Corporation, Portland, Oreg.
[22] Filed: June 23, 1975
[21] Appl. No.: 589,456
[52] U.S. Cl. ............................................. 260/17.5
[51] Int. Cl.² .................... C08H 5/02; C08L 97/00
[58] Field of Search ...................... 260/17.5, 124 A
[56] References Cited
UNITED STATES PATENTS

| | | | |
|---|---|---|---|
| 2,159,411 | 5/1939 | Wallace | 260/57 |
| 2,419,783 | 4/1947 | Longley | 260/124 |
| 2,429,102 | 10/1947 | Lewis et al. | 260/124 |
| 2,794,790 | 6/1957 | Marshall et al. | 260/17.5 |
| 3,149,085 | 9/1964 | Ball et al. | 260/17.5 |

Primary Examiner—Donald E. Czaja
Assistant Examiner—E. A. Nielsen
Attorney, Agent, or Firm—Peter P. Chevis

[57] ABSTRACT

Coating compositions prepared from phenolated lignosulfonates and polyunsaturated carboxylic acids are described.

18 Claims, No Drawings

COATING COMPOSITION

This invention pertains to alkyd-type coating compositions, more particularly to coating compositions of phenolated lignosulfonate and carboxylic acids and a process for their preparation.

Lignin is a polymeric substance found in plant and vegetable tissue associated with cellulose and other plant consituents. In the pulp and paper industry, lignin-containing materials such as wood, straw, corn stalks, bagasse, and other vegetable and plant tissues are processed to recover the cellulose or pulp with the lignin being chemically modified and obtained as a by-product. Since vegetable and plant tissue can contain up to 30% lignin, large amounts of lignin are available. Considerable effort has been expended in lignin research without too much success in the development of methods or processes to utilize more fully the chemical values of lignin present in the pulping liquors. The products, however, have found only limited markets resulting in appreciable amounts of the pulping liquors having to be processed mainly for disposal purposes rather than for recovery of any chemical values.

There are numerous patents pertaining to esterification of lignin, such as U.S. Pat. Nos. 2,419,783 and 2,429,102. The use of these materials in the preparation of coating compositions has been suggested in the above-listed patents as well as in U.S. Pat. No. 3,149,085. In spite of the numerous disclosures, the use of lignin or lignosulfonate in coating compositions as one of the main components has not been commercially successful. The uses made of these products have been mainly as fillers or diluents.

It is, therefore, the object of this invention to provide an alkyd-type coating composition. A further object is to provide a coating composition which is competitive with other alkyd coatings. A still further object is to provide a coating composition containing lignosulfonate wherein the lignosulfonate is an active constituent of the coating composition and not merely functioning as a filler or diluent. A still further object is to provide a process for the preparation of the coating compositions.

The above and other objects of this invention are attained by a coating composition comprising a reaction product of a polyunsaturated carboxylic acid having from 5 to 22 carbon atoms and a phenolated-lignosulfonate until a substantial proportion of the carboxylic groups of the acid has reacted with the phenolic hydroxyl groups of the phenolated-lignosulfonate. The phenolated-lignosulfonate contains at least 15 weight percent of phenol reacted with the lignosulfonate based upon the lignosulfonate solids. The coating compositions thus obtained are equal or superior in many respects to commercially available alkyd coatings prepared from unsaturated carboxylic acid reacted with polyols and aromatic anhydrides, such as phthalic anhydride.

Lignosulfonates obtained from any source may be used in preparation of the coating compositions. While there is some variation in the chemical structure of lignin and of other constituents found in different plants, depending upon the type of plant, place where grown, and also upon the method used in recovery or isolation of the particular constituents from the plant tissue, the basic structure and properties of these materials upon sulfonation are similar and form the well-known group of materials referred to as "lignosulfonates".

One of the main sources of lignosulfonates or sulfonated lignin is the residual pulping liquors obtained in the pulp and paper industry. In the sulfite pulping, lignocellulosic material is digested with sulfite or bisulfite, the resulting residue being a sulfonated pulping liquor commonly referred to as "spent sulfite liquor" containing the sulfonated lignin products. In other pulping processes, the residual pulping liquor as obtained from the process may not be a sulfonated product. However, the residual liquor or products containing the lignin portion of the lignocellulosic materials from the sulfite or other processes may be treated by various known methods to sulfonate the product to the degree desired. For example, the residual liquor obtained in an alkaline pulping process such as kraft, soda, or other processes, may be sulfonated to obtain a sulfonated residual pulping liquor useful in the preparation of the compositions of the present invention.

The sulfonated lignin products from sulfite pulping process or obtained by the sulfonation of other residual pulping liquors may contain other constituents besides sulfonated lignin. The products may contain carbohydrates, degradation products of carbohydrates, and resinous materials as well as other organic and inorganic constituents. Although these non-lignin materials may be removed or the lignosulfonate portion may be recovered from the lignin, it is not necessary to do so. Some of the non-lignin constituents, such as carbohydrates, may react with the reactants during the reactions but are not necessarily detrimental.

In addition to purification of the sulfonated lignin products, the sulfonated residual liquor, such as spent sulfite liquor or sulfonated lignin, may be subjected to various pretreatments, such as, for example, acid, alkaline, or heat treatments as well as reaction with other chemicals or oxidation to remove or modify some of the constituents or for other purposes. The lignin constituents may be affected to a certain extent by such treatments and the treatment may be beneficial as long as it is not so severe as to destroy the polymeric nature of the lignin. For example, the halogenation of a sulfonated lignin product, such as spent sulfite liquor, with chlorine will generally have a beneficial effect. Thus, the terms "lignosulfonate" and "sulfonated lignin" as used herein and commonly in the field, include the product subjected to these various treatments as long as the product retains the basic properties and characteristics associated with the untreated products.

Illustrative examples of the phenols which may be used are phenol, cresols, xylenols, resorcinol, catechol, hydroquinone, and naphthol, also chlorinated phenols may be used. The monohydric phenols are preferred.

The various known methods for the interaction of phenol with lignosulfonates may be used in the phenolation of the lignosulfonate. The reaction may be carried out by simply intermixing or dissolving the lignosulfonate product in the dry form in molten phenol. The reaction may also be carried out in a liquid medium or solvent in which at least one of the reactants is soluble. An aqueous medium is commonly used, since lignosulfonates and many of the phenols are soluble in water. However, organic solvents may also be employed. For example, aliphatic hydrocarbon solvents, especially the halogenated hydrocarbons of from 1 to 4 carbon atoms, dioxane, nitromethane, and dimethylsufoxide are illustrative of the solvents which may be used. The lower aliphatic alcohols, such as alcohols having from 1 to 4 carbon atoms, lower aliphatic organic acids of from 1 to 4 carbon atoms, and glycols may also be employed. When organic solvents, such as organic acids, alcohols, or glycols are used to aid in dissolving the lignosulfonate and phenol, generally the amount used is from about 5 to 20 weight percent of the lignosulfonate solids. The amount used is held to a minimum so that the solvent does not have to be recovered and may be left in the product to be reacted or function as solvent in the reaction with the unsaturated carboxylic acid.

The phenolation may be effected under either alkaline or acid conditions. Also, at times it may be desirable to effect the reaction with lignosulfonate or sulfonated lignin product being de-ashed or in acid form. The reaction temperature employed may be widely varied depending mainly upon the particular process and phenol used in the phenolation. While the reaction may proceed at a significant rate at room temperature and lower, generally, the reaction mixture is heated for from ¼ to 6 hours at a temperature in the range of 80° to 180° C to obtain a more rapid rate and greater amount of interaction between the lignosulfonate and phenol.

The interaction of a small amount of phenol with the lignosulfonate imparts some beneficial effect toward improving the coating composition. However, for practical purposes, generally at least 15 weight percent of phenol, based upon the lignosulfonate solids, is condensed with the lignosulfonate product to obtain a competitive coating. A product having from 30 weight percent of interacted phenol, based upon the lignosulfonate product solids, to the maximum amount of phenol value which may be reached under normal conditions, which is generally about 45%, is preferred. Usually the reaction is carried by intermixing the lignosulfonate with from 40 to 100 weight percent of phenol, based upon the lignosulfonate product solids, and reacting the mixture until a substantial portion of the phenol has reacted. The reaction may not go to completion and a portion of the phenol may remain unreacted. The unreacted phenol may be removed or recovered for re-use by extraction with a suitable solvent, vacuum distillation, or other means. All of the unreacted phenol does not have to be removed. Up to 10 weight percent phenol may remain and be reacted with the carboxylic acid without significantly lowering the quality of the coating composition.

In the reaction of the phenolated-lignosulfonate with the carboxylic acid any method of esterification by the reaction of an aromatic hydroxyl group with a carboxylic group may be used. A convenient method is to react a phenolated-lignosulfonate with the carboxylic acid by transesterification using a 4 to 8 carbon atom acid anhydride, preferably acetic anhydride. Acetic anhydride also functions as a solvent. The reaction may be carried out by the addition of the carboxylic acid and the phenolated-lignosulfonate to the acetic anhydride and heating the mixture to distill off the acetic acid formed as the reaction proceeds. Other non-reactive solvents for both reactants such as butyrolactone, propiolactone, or other acid anhydrides such as propionic or butyric anhydride may be used.

Another convenient way for the esterification reaction is to react the phenolated-lignosulfonate with the fatty acid chloride of the desired carboxylic acid. Upon heating the mixture, hydrogen chloride formed as the reaction proceeds may be distilled off or reacted with a suitable acid acceptor.

Any carboxylic acid having a boiling point greater than about 170° C. can be used in reaction with the phenolated-lignosulfonate. Unsaturated acids are available from natural sources with chain links of from 16 to 22 carbon atoms. The di-or triethenoid having from 8 to 22 carbon atoms are preferred with the acids coming from natural sources being most readily available.

Other reactants may also be added in relatively small amounts to improve the property of the coatings or lessen the cost. For example other polyols such as pentaerythritol, glycerol and others as well as small amounts of other acids such as resin acids, and phthalic anhydride in small amounts may lessen the cost as well as increase cross linking. In addition other reactants can be added which will give modified alkyds, such as, for example, the addition of dicarboxylic acids, such as succinic acid, and polyamines, such as diethylenetriamine, will result in obtaining a nylon-type modified alkyd. Small amounts of polyisocyanate, such as toluene diisocyanate will result in a polyurethane-modified alkyd, and the addition of Bisphenol A diglycidyl ether will result in epoxy ester-type modified coating resins.

In carrying out the reaction, the reaction mixture is generally heated and the acid resulting from the reaction distilled off until a major portion of the carboxylic acid groups has reacted, usually at temperatures in the range of about 170° to 240° C. It is preferred to initiate the reaction at a lower temperature and gradually increase the reaction temperature as the reaction proceeds to a temperature preferably in the range of 200° to 220° C during the later part of the reaction. In the transesterification reaction using acetic anhydride, the reaction proceeds at a moderate rate with the major portion of the carboxylic acid being reacted in a reaction time of about 1 to 3 hours. However, the reaction time can be increased or decreased and the carboxylic acid reacted with the phenolated-lignosulfonate for less than 20 minutes by increasing the reaction temperature or extended over a period of 20 hours or so. The rate of reaction and the extent of reaction can be conveniently noted by the determination of the acid distilled from the reaction mixture. A sufficient amount of the acetic anhydride is used to esterify most of the hydroxylic reactants. Generally an excess of the acid anhydride is preferred to insure a more complete reaction. However, the amount used can be considerably less than an equivalent amount for completion of the reaction up to about 2 or 3 molar equivalents. The unreacted carboxylic acid may be readily removed from the reaction mixture, if desired. Significant proportions of from 10 to 30% or so of the acid may remain unreacted without significantly deteriorating the film properties of the coating composition.

The following examples further illustrate the invention:

EXAMPLE I

An alkyd-type coating was prepared from a phonolated calcium-base spent sulfite liquor.

A fermented calcium-base spent sulfite liquor was deashed by treating the fermented calcium-base liquor with sulfuric acid to precipitate the calcium as calcium sulfate which was removed by filtration. The filtrate after the filtration contained about 271 g solids and 1.2% calcium. Phenol in an amount equal approximately to the weight of the spent sulfite liquor solids in the filtrate was added to the filtrate. A petroleum base hydrocarbon solvent having a boiling point between 160° to 170° C was also added in an amount of 2,750 ml. The reaction mixture was then heated and the vapors from the reaction mixture were condensed with the petroleum solvent being returned and the water discharged. After the water had distilled off, the reaction temperature was increased to 150° C and then maintained at that temperature for 30 minutes. The phenolated lignosulfonate was insoluble in the petroleum solvent. After the petroleum solvent with the unreacted phenol was decanted, the product was pan-dried by heating at 180° C for 30 minutes to vaporize the remaining solvent. It was estimated that the final product contained approximately 6.7% free phenol.

The above phenolated-lignosulfonate was used in preparation of an alkyd-type coating resin. Linseed acids in an amount of about 82 grams were added to 36 ml. of acetic anhydride which was maintained under a nitrogen atmosphere. The mixture was heated and stirred at 50° C after which 50 grams of the above-prepared phenolated-lignosulfonate were added and the heating and stirring continued. The linseed acids added contained 0.29 equivalents of carboxyl groups which was equal to the equivalents of the phenolic hydroxyl groups of the phenolated-lignosulfonate. The reaction mixture was heated at about 120° C for one hour permitting the acetic acid formed by the reaction to distill off. After cooling, 265 ml of methylbutylketone was added and a sample taken to determine the unreacted acid. The remaining reaction mixture was then treated with calcium hydroxide for two hours and filtered to remove the unreacted carboxylic acids. Prior to purification, the reaction mixture contained 13.5% unreacted acid which upon purification was reduced to 3.1%.

The above ester as a solution of about 29% solids in methylbutylketone was tested by coating metal test panels and determining the hardness, impact resistance, flexibility, and chemical resistance of the film. A cobalt naphthenate drier was added to the ester solution in an amount of about 0.04% of cobalt based upon the resin solid prior to coating the metal test panels. The test panels were 4 inches × 12 inches in size and were washed with detergent and water, distilled water, and acetone prior to coating the panel, using a vacuum table and coating rod to obtain a film of about 2 mils. Each panel was allowed to cure at room temperature overnight then heated in an oven at 150° C for 0.5 hour.

In testing the hardness of the coating, a drafting lead pencil was sharpened to a rectangular point and used to scratch the coating while the pencil was held at a 45° angle to the surface. Any marring of the surface, visible at an oblique angle in a strong light, indicated that the pencil was harder than the film. The hardness was expressed as a grade softer than that of a pencil which would mar the surface. The drafting pencils used were Eagle Turquoise brand drafting pencils.

The impact resistance test was made by dropping a weight upon a test punch placed upon the panel. The distance the weight was dropped was increased until a failure of the film was obtained. The values were measured in inch-pounds which represent the inches through which the given weight was dropped upon the punch before any failure of the film could be detected. The failure was indicated when a cotton ball soaked in acidic copper sulfate and placed in the punch depression caused a copper plate to appear through the coating film.

The flexibility test was performed by bending the panel through a 180° bend over a quarter inch mandrel, and noting the effect upon the coating film. Any breakage of the film was considered as failing the test.

The chemical resistance test was performed by placing a drop of a specified chemical on the coating for 15 minutes at room temperature after which observations were made for any softening, lifting, blistering or marring of the film. The chemical resistance was rated as "not affected" where the film was entirely unaffected by the solvent, but where there was some action to the chemical, the resistance was rated as A, B, C, and poor.

In the above test, the film had a pencil hardness of H, an impact resistance of 70 to 80 inch-pounds, and chemical resistance rating to toluene and 5% caustic as A. The film passed the flexibility test.

EXAMPLE II

A second run was made where the phenolated-lignosulfonate was prepared using a decreased amount of phenol and the ratio of fatty acid to the phenolic hydroxyl was increased.

Fermented calcium-base spent sulfite liquor was deashed by addition of sulfuric acid and then filtered to remove the calcium sulfate. The filtrate was spray-dried and contained about 1.1% calcium on a dry basis. The deashed lignosulfonate was added to phenol in an amount such that the amount of phenol present was about 35 weight percent of the deashed spent sulfite liquor solids. A small amount of water representing about 8% of the phenol was also added. The reactor containing the phenol and the deashed lignosulfonate was placed in an oil heating bath at 156° C and heated under a nitrogen atmosphere for about four hours. The reactor was equipped with a partial condenser to permit the water vaporized during the heating to distill off. The phenolated-lignosulfonate reaction product obtained contained about 2.7% free phenol and 26.3% of reacted phenol in the phenolated-lignosulfonate.

The phenolated-lignosulfonate in an amount of 50 grams having a phenolic hydroxyl equivalent of 0.26 was reacted with 87 grams of linseed acids which contained 0.31 equivalents of carboxylic acid groups. Acetic anhydride was used in the transesterification reaction and was added in an amount of 39 grams which represented 0.38 moles. The mixture was heated to distill off the acetic acid under a nitrogen atmosphere. The distillation was continued for a period of 2-½ hours with the temperature reaching about 270° C near the end of the distillation period for a short time prior to cooling to 120° C and maintaining the product at that temperature for about 30 minutes. The reaction mixture obtained contained about 36% unreacted acid and was tested unpurified as a coating film dissolved in a petroleum hydrocarbon solvent having a boiling point range of 160° to 170° C. A solution of 26 weight percent of the resin, containing about 0.04% cobalt added as 6% cobalt naphthenate as a drier, was applied to the test panels as noted in Example I. Upon curing, the film was tested and found to have a hardness of 2H, and impact resistence of 70 to 80 inch-pounds and a chemical resistance rating to toluene of B, and a chemical resistance to 4% caustic solution of A. The film passed the flexibility test.

EXAMPLE III

Tall oil acids were used as the polyunsaturated carboxylic acid in preparation of alkyd-type coating.

The deashed lignosulfonate as described in Example II above was mixed with about 48% phenol, based upon the spent sulfite liquor solids, and reacted in a method similar to that described above. The phenolated-lignosulfate reaction mixture obtained contained about 6% free phenol and the phenolated-lignosulfonate contained about 32% reacted phenol.

The above phenolated-lignosulfonate in an amount of 50 grams containing 0.31 equivalents of phenolic hydroxyl was reacted with 52 grams of tall oil acids which contained 0.2 carboxylic acid equivalents. Acetic anhydride was added in amount of 39 grams which represented about 0.38 moles. The tall oil acid and the acetic anhydride were heated to 65° C prior to the addition of the phenolated-lignosulfonate. After the addition of the phenolated-lignosulfonate, the mixture was heated to distill off the acetic acid formed in the reaction. After the distillation had started the distillation was continued for about 50 minutes in which time the maximum temperature of about 190° C was obtained. The reaction product contained about 23% unreacted acid and was tested as a coating as 25 weight percent solution in methylbutylketone. The drier used was a commercial drier being a mixture of cobalt, lead and calcium naphthenates. The drier was added in an amount to obtain 0.07% cobalt, 0.5% lead, and 0.1% calcium. Upon the application of the coating to the test panel, curing, and testing the coating in a manner similar to that described in Example I a pencil hardness of B was obtained. The impact resistance was 50 to 60 inch-pounds and the chemical resistance was rated as B for toluene as well as for a 2% caustic solution. The film passed the flexibility test.

EXAMPLE IV

A phenolated-lignosulfonate was prepared by adding an equal amount of spray-dried, deashed calcium-base spent sulfite liquor to an equal amount of phenol and slowly heating the mixture to a temperature of 140° to 150° C under partial condensation to distill off the water. After the reaction, the product was washed with water to remove a portion of the unreacted phenol and then further purified by chloroform extraction. The purified product obtained contained about 1.7% free phenol and it was estimated that the phenolated-lignosulfonate contained 44% reacted phenol.

The phenolated-lignosulfonate in amount of 800 grams representing 5.1 equivalents of phenolic hydroxyl were mixed with 1,275 grams of linseed acids representing about 4.52 moles or equivalents of the carboxylic acid groups. To this mixture 844 grams of acetic anhydride were added which represented 8.26 moles. The mixture was heated distilling off the acetic acid formed in the reaction at a rate such that in about five hours the reaction mixture was at a temperature of 220° C. The distillation was then continued for an additional 5 hours at about 220° C. The product obtained contained about 4% unreacted acid which after purification with calcium oxide was decreased to 2.3%. This product was tested as a coating composition as a 52 weight percent solution in methylbutylketone. The drier used was a cobalt naphthenate and was added in an amount to obtain about 0.04 weight percent of cobalt. The pencil hardness obtained was 2B, while the impact resistance was 50 to 60 inch-pounds. The film had a chemical resistance rating of A for a 5% caustic solution and passed the flexibility test.

The hardness of the film was rechecked by using a less concentrated solution of the resin. With a 30 weight percent solution of the resin in methylbutylketone, the film obtained had a pencil hardness of H.

EXAMPLE V

A coating composition was prepared using a dehydrated castor oil fatty acid as the polyunsaturated carboxylic acid.

A high molecular weight lignosulfonate fraction obtained by gel permeation fractionation of a fermented calcium-base liquor was base-exchanged to the sodium form by addition of sodium sulfate and removal of calcium sulfate. The high molecular weight lignosulfonate in a dry form in an amount of 420 grams was slowly added to 450 grams of liquid phenol at about 60° C. After the lignosulfonate had been added, 30.5 ml of concentrated sulfuric acid was added, and the mixture reacted overnight at a temperature of about 120° C. The product was then distilled under vacuum to remove a portion of the unreacted phenol after which it was cooled, washed with water and extracted with chloroform. The product obtained contained about 7.4% free phenol. The phenolated-lignosulfonate contained about 45% reacted phenol.

In preparation of the alkyd resin, 50 grams of the phenolated-lignosulfonate containing approximately 0.3 equivalents of phenolic hydroxyl was mixed with 116.6 grams of the dehydrated castor oil acid which represented 0.41 moles or equivalents of carboxylic acid groups. To this mixture, 50.8 grams of acetic anhydride or 0.49 moles were added, and the mixture heated for a total of seven hours distilling off the acetic acid formed in the reaction. The reaction product obtained contained about 9.2% unreacted acid which after purification was reduced down to 1.2%. Upon testing the purified resin as a 30% solution in toluene, a pencil hardness of F was obtained. The impact resistance was 40 to 50 inch-pounds. The film had a chemical resistance of A for toluene, was not affected by a 5% caustic solution, and passed the flexibility test.

What is claimed is:

1. A coating composition comprising a reaction product of a polyunsaturated carboxylic acid having from 5 to 22 carbon atoms and a phenolated-lignosulfonate, said carboxylic acid being reacted with the phenolated-lignosulfonate until a substantial proportion of the carboxyl groups of the acid has reacted with the phenolic hydroxyl groups of the phenolated-lignosulfonate, said phenolated-lignosulfonate being obtained by reacting a phenol with the lignosulfonate in an amount of at least 15 weight percent, based upon lignosulfonate solids.

2. A composition according to claim 1 wherein the carboxylic acid is reacted with the phenolated-lignosulfonate by intermixing the carboxylic acid in an equivalent ratio of carboxyl groups of the acid to the phenolic hydroxyl groups of the phenolated-lignosulfonate in a range of from 1:0.5 to 1:2.

3. A coating composition according to claim 2 wherein a phenolated-lignosulfonate is reacted with phenol until the phenolated-lignosulfonate contains at least 25% reacted phenol.

4. A composition according to claim 3 wherein the carboxylic acids are naturally occuring di- and triethenoic carboxylic acid and mixtures thereof.

5. A composition according to claim 3 wherein the carboxylic acid is a dehydrated castor oil acid.

6. A composition according to claim 3 wherein the carboxylic acid is linseed acids.

7. A composition according to claim 3 wherein the carboxylic acid is reacted with the phenolated-lignosulfonate by transesterification reaction using an acid anhydride having from 4 to 8 carbon atoms.

8. A composition according to claim 7 wherein the acid anhydride is acetic anhydride.

9. A composition according to claim 8 wherein the carboxylic acid is dehydrated castor oil acid.

10. A composition according to claim 8 wherein the carboxylic acid is linseed acids.

11. A composition according to claim 8 wherein the carboxylic acid is a tall oil acid.

12. A process for the preparation of an alkyd type resin, which comprises mixing a polyunsaturated carboxylic acid having from 5 to 22 carbon atoms with a phenolated-lignosulfonate and an acid anhydride having from 4 to 8 carbon atoms, heating the mixture to react the carboxylic acid with the phenolated-lignosulfonate and distilling the acid formed in the reaction of the carboxylic acid with the phenolated-lignosulfonate until a substantial proportion of the carboxyl groups of the carboxylic acid and the phenolic hydroxyl groups of the phenolated-lignosulfonate have reacted, said phenolated-lignosulfonate being obtained by reacting a phenol with a lignosulfonate in an amount until the phenolated-lignosulfonate contains at least 15 weight percent of phenol, based upon lignosulfonate solids, reacted with the lignosulfonate.

13. A process according to claim 12 wherein the carboxylic acid is mixed with the phenolated-lignosulfonate in an equivalent ratio of carboxyl groups of the acid to the phenolic hydroxyl groups of the phenolated-lignosulfonate in the range of from 1:0.5 to 1:2.

14. A process according to claim 13 wherein the phenolated-lignosulfonate is reacted with phenol until the phenolated-lignosulfonate contains at least 25% reacted phenol.

15. A process according to claim 14 wherein the carboxylic acids are naturally occuring di- and trietheonic carboxylic acids and mixtures thereof.

16. A process according to claim 14 where the acid anhydride is acetic anhydride.

17. A process according to claim 16 wherein the carboxylic acid is a dehydrated castor oil acid.

18. A process according to claim 16 wherein the carboxylic acid is linseed acids.

* * * * *